June 16, 1925.
C. A. FRICK
1,542,785
AUTOMOBILE BODY
Filed March 22, 1924      2 Sheets-Sheet 1
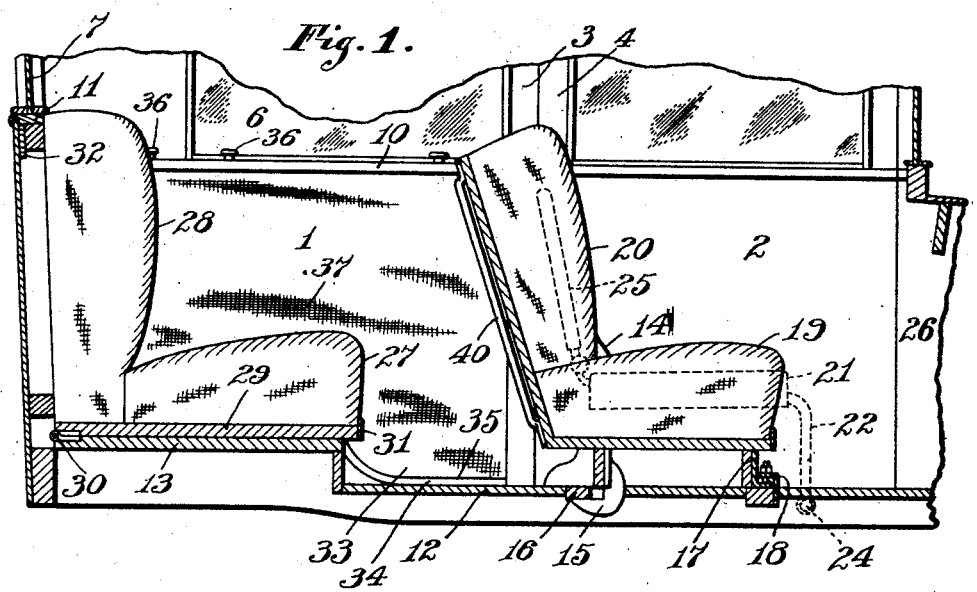
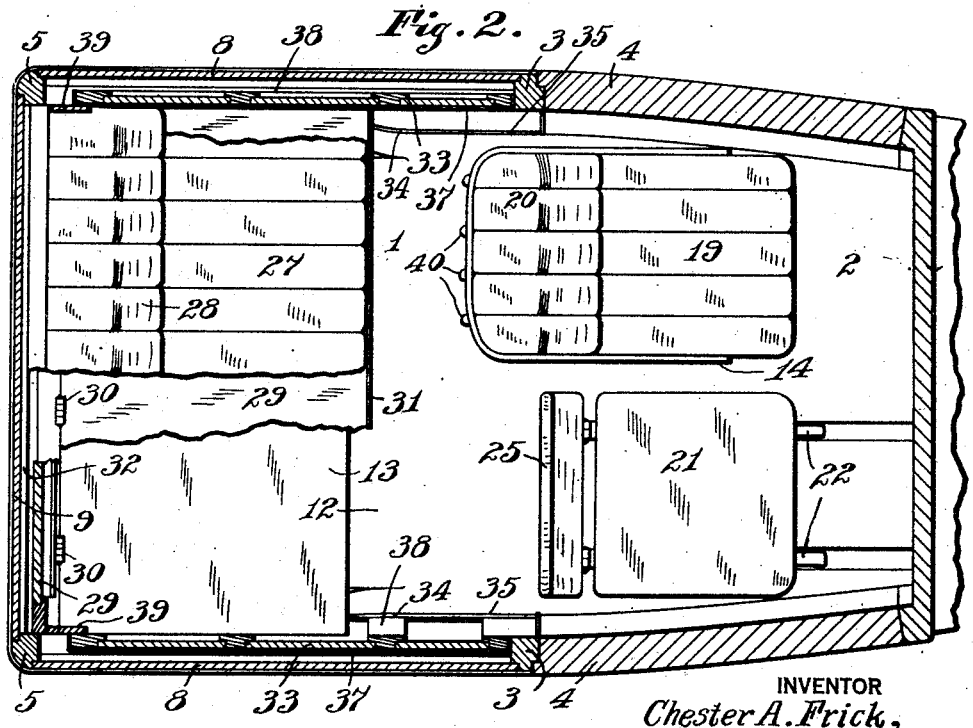
INVENTOR
Chester A. Frick,
BY
Hood & Hahn
ATTORNEYS June 16, 1925.  
C. A. FRICK  
1,542,785  
AUTOMOBILE BODY  
Filed March 22, 1924  
2 Sheets-Sheet 2
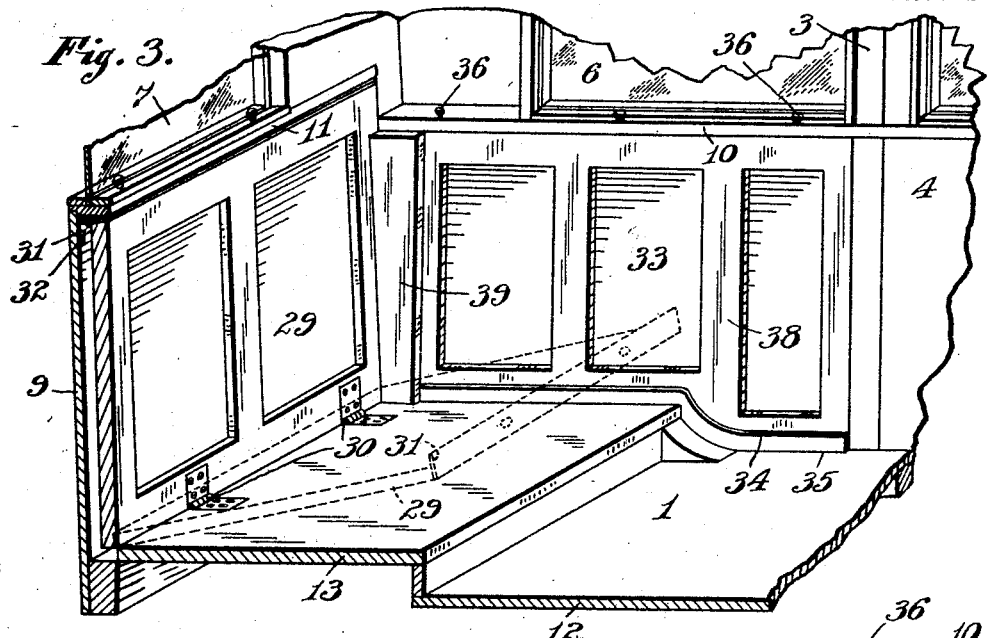
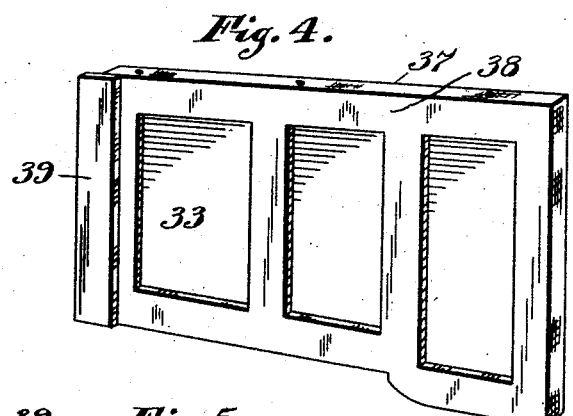
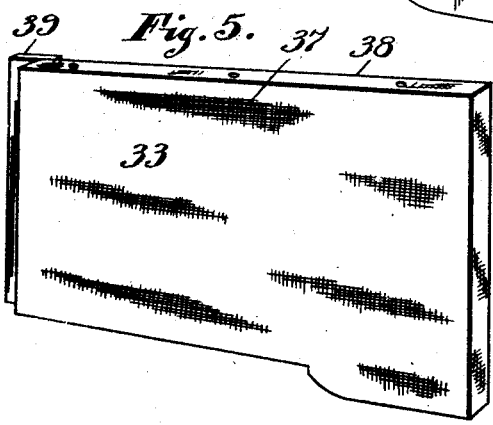
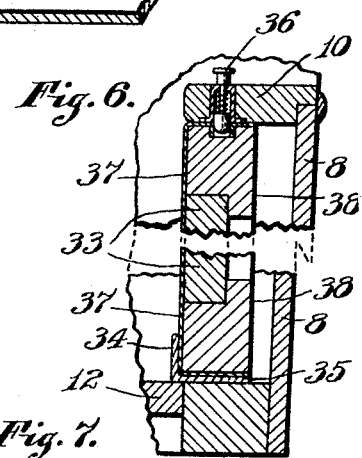
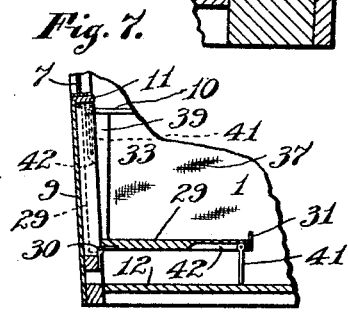
INVENTOR  
Chester A. Frick,  
BY  
Hood & Hahn  
ATTORNEYS Patented June 16, 1925.

1,542,785

UNITED STATES PATENT OFFICE.

CHESTER A. FRICK, OF MUNCIE, INDIANA, ASSIGNOR TO GLASCOCK BROTHERS MANUFACTURING COMPANY, OF MUNCIE, INDIANA, A CORPORATION OF INDIANA.

AUTOMOBILE BODY.

Application filed March 22, 1924. Serial No. 700,996.

*To all whom it may concern:*

Be it known that I, CHESTER A. FRICK, a citizen of the United States, residing at Muncie, in the county of Delaware and State of Indiana, have invented a new and useful Automobile Body, of which the following is a specification.

My invention relates to improvements in automobile bodies and particularly to that class commercially known as the closed body type.

One of the objects of my invention is to provide a body which may be converted from a passenger carrying body into a freight carrying body in which articles and packages of various character may be transported without damage to the interior trim of the body.

Another object of my invention is to provide a body of the above type which, when converted into a freight carrying body, will be provided with a gear compartment having substantially straight sides and forming a substantially rectangular compartment, whereby the danger of tilting of the articles carried in said compartment when being transported over rough roads will be obviated.

For the purpose of disclosing my invention, I have illustrated certain embodiments thereof in the accompanying drawings, in which—

Fig. 1 is a longitudinal sectional view of a body embodying my invention;

Fig. 2 is a horizontal sectional view of the same;

Fig. 3 is a sectional perspective view of the body of Fig. 1 showing the same in converted condition;

Fig. 4 is a perspective view of one of the side liner panels showing the untrimmed face;

Fig. 5 is a perspective view of a side liner panel showing the trimmed face;

Fig. 6 is a detail section showing the manner of retaining the side liner panels in position, and.

Fig. 7 is a detail section showing a modification.

In the embodiment illustrated, the body is of the closed body type, having a rear seating compartment 1 and a forward seating compartment 2. The body is preferably formed with side door pillars 3 which extend clear to the top of the body and provide a means for supporting not only the top, but the side doors 4. Rear corner pillars 5 are likewise provided which extend clear to the top of the body and these, together with the side door pillars, provide a frame work for the top portion of the body, in which top portion the usual side windows 6 and rear windows 7 are mounted. The exterior of the body, below the side windows, is preferably finished by exterior side panel members 8 which are secured in position by attachment to the side and corner pillars and other parts of the body frame. The rear lower portion of the body is likewise finished by a rear panel 9 likewise secured in position. At the top of this panel and providing a means for securing the same in position, is a pair of side trim-rails 10 which are located just below the side windows, and a similar rear trim rail 11 is provided at the rear of the body.

The body is provided with the usual floor 12 preferably formed of boards or the like and at the rear portion of the body this floor is elevated as at 13 and forms the base of the rear seat. A forward driver's seat 14 is removably supported in position on the floor by means of suitable clamps 15 which fit in slots in the floor and engage beneath a holding rail 16. The forward end of the seat is provided with an L shaped leg 17, the horizontal portion of which engages beneath a locking clamp 18 to prevent the seat from tilting rearwardly. This seat is provided with removable seat and back cushions 19 and 20 respectively.

Arranged at the side of the driver's seat is a passenger seat 21 which is provided with front legs only, 22, hinged at 24 to permit the seat to be folded in a vertical position. This seat is provided with a hinged back 25 which may be folded down on the seat and the legs of the seat are so positioned that when the back is folded down and the seat folded forward, it will fit beneath the hood portion 26.

The rear seat is provided with a removable seat cushion 27 and a removable back cushion 28. This back cushion, when in position, has its top engaging beneath the back or rear trim rail 11 and the seat cushion and bottom of the back rest upon a panel member 29 which forms a false bottom and is hinged at its rear end at 30 to the elevated portion 14 and is provided at its forward end with a trim strip 31 which prevents the rear seat from sliding forward when placed in position. This panel member 29, from front to back, is equal to the top and bottom dimension of the rear seat back cushion 28 so that, when this cushion is removed, the panel may be raised vertically to take the place of the cushion and its free end will fit beneath the trim rail 11 and rest against the cross brace 32.

The interior sides of the rear compartment 1 are finished by removable panels 33 which fit between the floor 12 and the trim rails 10, each panel at its forward end being extended to take up the additional height between the trim rail and the floor. The lower edge of each panel fits behind the vertical side 34 of an L channel 35 secured to the floor and at its upper end engages beneath the side trim rail 10, being held in position by means of spring pressed bolts 36, or other locking means.

Each of these panels has a trimmed face 37, which is provided with the usual interior trimming of an automobile body, such for instance as padded leather, padded cloth or like finishing material, and with an untrimmed face 38 which may be left in the natural wood finish or may be stained as desired. These panels are so arranged that by transposing them from one side to the other, either the trimmed or untrimmed face will be presented to the interior of the car as desired.

When it is desired to use the car as a passenger car, the side panels will be inserted in position to present the trimmed face toward the interior of the car and the back seat and back seat cushion placed in position. The car, in this condition, becomes a passenger car of the closed body type and presents a finished appearance. If it be desired to use the car as a freight carrier, the rear seat cushion and back may be removed and the panel member 29 raised to occupy the position formerly occupied by the rear seat back cushion. This panel member is generally provided with a rugged finish so that it will not be marred by the articles carried in the body and even if it is marred, it will not show when folded down. The two side panels are transposed so that the untrimmed face will be presented toward the interior of the car and as this untrimmed face is provided with a rugged finish, injury or marring will not affect the appearance of the car when it is used as a passenger car. The rear and side panels are so disposed that they present straight sides and a substantially straight rear portion, whereby a substantially rectangular box shaped compartment is formed back of the driver's seat. As the rear panel inclines slightly rearwardly, when raised, there is a slight gap between this panel and the rear edge of the side panels. To fill this gap and provide a means for additionally bracing the side panels and rear panels, the side panels are provided, on their unfinished face, with filler strips 39, which may be formed of metal if desired. It will be noted that, when the side panels are inserted in position to present the trimmed face toward the interior of the car, that these filler strips occupy the space between the interior side panels and the exterior side panels and are out of the way.

In order to additionally safeguard the trim of the interior of the car, the back of the driver's seat is provided with guard strips 40, preferably of metal, as for instance aluminum or the like, which extend vertically of the back and prevent the finish of the back from being marred by the articles carried in the rear compartment striking against the same.

It will be noted that, when it is desired to use the car as a freight carrier, by folding the passenger seat forward under the hood, a clear space is provided to permit ready access through the door to the rear compartment so that bulky articles may be readily placed in the rear compartment. It will be further observed that if desired, both of the front seats may be removed, if it is desired to have a greater space within the car for sleeping or other purposes.

In Fig. 7 I have illustrated a modification wherein the elevated portion 13 is dispensed with. Under these circumstances, panel member 29 is provided with a pair of legs 41 pivoted at the forward end thereof and adapted to support this panel member in horizontal position to thereby provide means for supporting the rear seat cushion. When the panel member 29 is raised to vertical position, these legs 41, being pivoted to the panel member, will drop into grooves 42 in the face of the panel member.

I claim as my invention:

1. An automobile body, including a tonneau having a rear seating compartment, a rear seat arranged in said compartment having a removable seat cushion and removable side panel liners for the interior of said compartment having one face trimmed and the other untrimmed, said liners being so arranged as to be inserted in position to present either the trimmed or untrimmed face to the interior of the car.

2. An automobile body, including a tonneau of the closed body type and provided with side and rear windows and having doors at the forward portion, said tonneau being provided with a rear seating compartment, a rear seat arranged in said compartment having a removable seat cushion, a trim rail on the interior sides of said compartment and below the windows thereof and removable side panel liners for the interior of said compartment insertable between the floor and said trim rail and having one face trimmed and the other untrimmed, said liners being so arranged as to be inserted in position to present either the trimmed or untrimmed face to the interior of the car.

3. An automobile body, including a tonneau having a rear seating compartment, a rear seat arranged in said compartment having a removable seat cushion and removable back cushion, side panel liners for the interior of said compartment having one face trimmed and the other untrimmed, said liners being so arranged as to be inserted in position to present either the trimmed or untrimmed face to the interior of the car, and a back panel liner insertable in place of the back cushion when the back cushion is removed.

4. An automobile body, including a tonneau having a rear seating compartment, a rear seat arranged in said compartment having a removable seat cushion and a removable back cushion, removable side panel liners for the interior of said compartment having one face trimmed and the other untrimmed, said liners being so arranged as to be inserted in position to present either the trimmed or the untrimmed face to the interior of the car, and a rear seat cushion support hinged at its rear to raise vertically and form a panel when the rear back cushion is removed.

5. An automobile body, including a tonneau of the closed body type having doors at its forward portion and having a rear seat compartment, a trim rail extending around the sides and back of said compartment and below the windows thereof, a rear seat in said compartment having removable seat and back cushions, side panel liners removably mounted between the floor and trim rail and having one face thereof trimmed and the other face untrimmed, said liners being arranged to be placed in position to present either the trimmed or untrimmed face toward the interior of the car, and a rear panel liner insertable beneath the trim rail when the rear seat cushion is removed.

6. An automobile body, including a tonneau having a rear seating compartment, a rear seat arranged in said compartment having a removable seat cushion and removable side panel liners for the interior of said compartment, having one face trimmed and the other untrimmed, said liners being so constructed as to be transposed to opposite sides of the compartment and thereby present either the trimmed or untrimmed face to the interior of the compartment.

In witness whereof, I CHESTER A. FRICK have hereunto set my hand at Muncie, Indiana, this 8th day of March, A. D. one thousand nine hundred and twenty four.

CHESTER A. FRICK.